United States Patent [19]

Pyun et al.

[11] Patent Number: 5,284,889
[45] Date of Patent: Feb. 8, 1994

[54] ELECTRICALLY INSULATING FILM BACKING

[75] Inventors: Eumi Pyun; Pamela S. Tucker, both of Austin, Tex.

[73] Assignee: Minnesota Mining and Manufacturing Company, St. Paul, Minn.

[21] Appl. No.: 979,620

[22] Filed: Nov. 20, 1992

[51] Int. Cl.$^5$ .................. C08K 5/3417; C08K 5/06; C08K 3/22

[52] U.S. Cl. ...................... 524/94; 428/463; 524/373; 524/412; 524/436; 524/437

[58] Field of Search .............. 524/436, 437, 410, 411, 524/412, 94, 373; 428/463

[56] References Cited

U.S. PATENT DOCUMENTS

| | | | |
|---|---|---|---|
| 3,202,567 | 8/1965 | Muri et al. | 428/463 |
| 3,832,326 | 8/1974 | North et al. | 524/264 |
| 3,922,442 | 11/1975 | North et al. | 428/447 |
| 3,941,859 | 3/1976 | Batuik et al. | 260/897 B |
| 4,036,912 | 7/1977 | Stricharczuk | 260/897 A |
| 4,407,992 | 10/1983 | Keogh | 524/436 |
| 4,769,283 | 9/1988 | Sipinen et al. | 428/343 |
| 4,772,642 | 9/1988 | Staendeke | 523/205 |
| 4,808,474 | 2/1989 | Sipinen | 428/343 |
| 4,845,146 | 7/1989 | Inoue et al. | 524/436 |
| 4,985,024 | 1/1991 | Sipinen | 604/389 |
| 5,017,637 | 5/1991 | Smith et al. | 524/354 |
| 5,071,904 | 12/1991 | Martin et al. | 524/458 |
| 5,134,012 | 7/1992 | Arakawa et al. | 428/152 |

FOREIGN PATENT DOCUMENTS

| | | | |
|---|---|---|---|
| 39114/85 | 11/1988 | Australia | C08L 23/04 |
| 272071 | 6/1988 | European Pat. Off. | C08K 3/22 |
| 391336 | 10/1990 | European Pat. Off. | C08K 13/02 |
| 466193 | 1/1992 | European Pat. Off. | C08K 9/04 |
| 3134041 | 6/1991 | Japan | C08K 3/00 |
| 3149240 | 6/1991 | Japan | C08K 3/22 |
| 83/00488 | 2/1983 | PCT Int'l Appl. | C08K 5/06 |

OTHER PUBLICATIONS

L. Delfosse, C. Baillet—Polymer Degradation and Stability, 23 (1989) 337-347.
John W. Lyons—*The Chemistry and Uses of Fire Retardants* 293-296 (1970).

*Primary Examiner*—Veronica P. Hoke
*Attorney, Agent, or Firm*—Gary L. Griswold; Walter N. Kirn; Darla P. Neaveill

[57] ABSTRACT

An electrically insulating film having a total halogen content of about 1% to about 8%, comprising a resin component containing:
a) from 0 to about 40 parts of a rubber selected from EP or EPDM rubber,
b) correspondingly, from about 60 to about 100 parts of an ethylene vinyl acetate polymer,
c) from about 20% to about 40% based on said resin component, of a flame retardant system comprising
 i) from about 5 to about 25% of a bromine containing flame retardant,
 ii) from about 1.5% to about 10% of an antimony containing flame retardant, and
 iii) from 1% to about 20% of a flame retardant selected from granular metal oxide hydrates, wherein said flame retardant system has a ratio of metal oxide hydrate to bromine of no more than about 3;

said film being free of vinyl chloride wherein a nonoriented film self-extinguishes in less than about 5 seconds, has an elongation at break of at least about 500%, a dielectric strength of at least about 1200 V/Mil, and a stress-strain curve having a wholly positive slope.

15 Claims, 10 Drawing Sheets

EXAMPLE 33

ELECTRICALLY INSULATING FILM BACKING

BACKGROUND OF THE INVENTION

The invention relates to electrically insulative polymeric films useful as conductive insulators and electrical tape backings.

DESCRIPTION OF THE RELATED ART

Various electrically insulative resins are known in the art. Polyolefins have been used in various resins, with and without flame retardancy in the electrical industry.

Most insulative films which are used commercially, and have both good flame retardancy and good physical properties contain some vinyl chloride. Because of the toxins produced when such compositions are burned, either accidentally or when discarded, it is desirable to reduce the halogen content as much as is possible, particularly chlorine content. However, it is difficult to attain both the flame retardancy and the physical properties such as tensile and elongation in an alternative product. This is especially true of films being used for tape backings in the electrical industry where the tapes must stretch and drape in a certain manner to be acceptable for use.

U.S. Pat. No. 5,017,637 discloses fire-retardant thermoplastic compounds that are chemically crosslinked, comprising 5–60% olefinic copolymers, 1–15% organopolysiloxane, and 20–85% flame retardant. Preferred embodiments include a copolymer, and an additional elastomer or ethylene copolymer. The preferred elastomers are EP or EPDM copolymers. Ethylene vinylacetate is also disclosed. Metal oxide hydrates are used as the fire-retardant compound.

U.S. Pat. No. 3,941,859 discloses EPDM polymers physically blended with polyethylene and an ethylene-vinyl acetate copolymer having improved tensile strengths. Use as wire and cable insulation is disclosed. It is specifically stated that EP copolymers do not provide the properties required.

JP 3149240 discloses a composition useful as a wire coating comprising 100 parts of polyolefin, 80–200 parts of a metal hydroxide for fire retardancy, and a silane coupling agent. The example disclosed contains 80 parts of EP rubber, 20 parts of ethylene vinyl acetate copolymer, and 110 parts of magnesium hydroxide, 5 parts of a silane, along with minor ingredients such as carbon black and a crosslinking agent.

U.S. Pat. No. 5,071,904 discloses ammonium polyphosphate particles treated with a cationic surfactant to impart flame retardancy. The particles are used in a resin which may be polyolefins, epoxy, or polyether urethanes.

JP 3134041 discloses a polyolefin resin with flame retardant and a specific triazine which is useful as a coating material for electrical wires and cables.

PCT WO 83/00488 discloses a flame retardant insulative wire coating comprising a polyolefin resin containing two flame retardants; a brominated flame retardant and antimony oxide. It is disclosed that the tensile strength of such compositions is about 2100 psi, and the elongation is about 400%.

AUS-B-39114/85 discloses a flame retardant insulative composition comprising copolymers of ethylene and acrylic esters. Aluminum hydroxide is used as the flame retardant.

EPO 391336 discloses polypropylene and silane containing ammonium polyphosphate particles for flame retardance.

U.S. Pat. No. 3,922,442 discloses a ethylene vinyl acetate copolymer containing a silane which is used for electrical conductor coatings.

U.S. Pat. No. 3,832,326 discloses an electrical wire coating comprising at least 66% of crosslinkable ethylene vinyl acetate copolymer, and a minor amount f a polyolefin. Silane treated hydrated inorganic fillers are added for flame retardancy. Elongations of 140% to 425% are disclosed.

U.S. Pat. No. 4,772,642 discloses a resin containing polyolefins, preferably polypropylene. Ammonium polyphosphate particles are used for flame retardance, and a melamine resin is preferred to encapsulate the particles.

EP 466193 discloses an ethylene vinyl acetate copolymer useful for cable jacketing containing magnesium hydroxide for flame retardancy.

GB 272071 discloses a resin containing ethylene vinyl acetate copolymers having a vinyl acetate level of more than 60%, and a minor amount of acrylonitrile-butadiene copolymer.

Polyolefins and ethylene vinyl acetate copolymers are also known for use in non-flame retardant tape backings. U.S. Pat. No. 4,036,912 discloses a closure tape for a disposable diaper having as its backing, a blend of an ethylene-propylene or ethylene-propylene diene polymer and a crystalline polypropylene polymer.

U.S. Pat. Nos. 4,808,474 and 4,769,283 disclose a pressure-sensitive adhesive tape backing having improved toughness comprising blends of crystalline isotactic polypropylene and compatible flexible polymers (in the former) or compatible ethylene containing polymers (in the latter), such polymers including EPDM and/or EVA. U.S. Pat. No. 4,985,024 discloses a biodegradable pressure-sensitive adhesive tape backing comprising such a blend combined with an unsaturated elastomer.

U.S. Pat. No. 5,134,012 discloses a fixing tape for a disposable diaper comprising a two or three layer construction; a plastics film layer, a polymer blend layer, and an adhesive layer. The plastics film layer may contain an EVA copolymer, and EP copolymer, or a combination thereof; the polymer blend layer contains at least two resins selected from EVA, EP, and polyethylene.

However, these attempts to produce a film for the electrical industry, and especially for tape backings, have not been able to produce a film with the required flame retardance and physical properties.

The present inventors have found that films comprising ethylene vinyl acetate (EVA) copolymers and an elastomer selected from ethylene propylene (EP) and ethylene propylene diene monomer (EPDM) rubbers and an effective amount of a specific flame retardant system will provide an electrically insulative film with good physical properties without vinyl chloride. The films have a total halogen content of less than about 8%

Further, such films will provide electrical tape backings having the feel, and handling properties of the most popular poly(vinyl chloride) backings with minimal amounts of halogen, which reduces or eliminates the release of toxic gases into the air, and also reduces negative environmental aspects from processing and disposal.

SUMMARY OF THE INVENTION

The invention provides a low-halogen, electrically insulating film having a total halogen content of 1 to about 8%, comprising a resin component containing:
a) from 0 to about 40 parts of a rubber selected from EP or EPDM rubber,
b) correspondingly, from about 60 to about 100 parts of an ethylene vinyl acetate polymer,
c) from about 20% to about 40% based on said resin component, of a flame retardant system comprising
   i) from about 5 to about 25% of a bromine containing flame retardant,
   ii) from about 1.5% to about 10% of an antimony containing flame retardant, and
   iii) from 1% to about 20% of a flame retardant selected from granular metal oxide hydrates, wherein said flame retardant system has a ratio of metal oxide hydrate to bromine of no more than about 3;
said film being free of vinyl chloride, wherein a nonoriented film self-extinguishes in less than about 5 seconds, has an elongation at break of at least about 500%, a dielectric strength of at least about 1200 V/Mil, and a stress-strain curve having a wholly positive slope.

Insulating films of the invention are suitable for use as an electrical tape backing. Preferred electrical tape backings are low-halogen electrical tape backings having a total halogen content of about 1% to about 8% comprising
a) from 10 to about 40 parts of a rubber selected from EP or EPDM rubber,
b) correspondingly, from about 60 to about 90 parts of an ethylene vinyl acetate polymer,
c) from about 20% to about 40% based on said resin component, of a flame retardant system comprising
   i) from about 5 to about 25% of a bromine containing flame retardant,
   ii) from about 1.5% to about 10% antimony oxide, and
   iii) from 1% to about 20% of aluminum trihydrate, wherein said flame retardant system has a ratio of aluminum trihydrate to bromine of no more than about 3;
said film being free of vinyl chloride, wherein a nonoriented film self-extinguishes in less than about 5 seconds, has an elongation at break of at least about 500%, a dielectric strength of at least about 1200 V/Mil, and a stress-strain curve having a wholly positive slope.

The invention also provides electrical tapes comprising a backing film having a total halogen content of about 1% to about 8%, comprising a resin component containing:
a) from 0 to about 40 parts of a rubber selected from EP or EPDM rubber,
b) correspondingly, from about to about 100 parts of an ethylene vinyl acetate polymer,
c) from about 20% to about 40% based on said resin component, of a flame retardant system comprising
   i) from about 5 to about 25% of a bromine containing flame retardant,
   ii) from about 1.5% to about 10% of an antimony containing flame retardant, and
   iii) from 1% to about 20% granular aluminum trihydrate, wherein said flame retardant system has a ratio of aluminum trihydrate to bromine of no more than about 3;
said film being free of vinyl chloride, wherein said tape self-extinguishes in less than about 5 seconds, has an elongation at break of at least about 500%, a dielectric strength of at least about 1200 V/Mil, and a stress-strain curve having a wholly positive slope, and an adhesive coated on one major surface of said backing.

As used herein the term "low halogen" includes all film compositions having an actual halogen content of from about 1% to about 8%.

As used herein, the term "granular" refers to particulates prepared by grinding processes, and does not include precipitated particulates.

All weights, percents, parts, and ratios herein are by weight unless specifically noted otherwise.

DETAILED DESCRIPTION OF THE INVENTION

Figure 1:
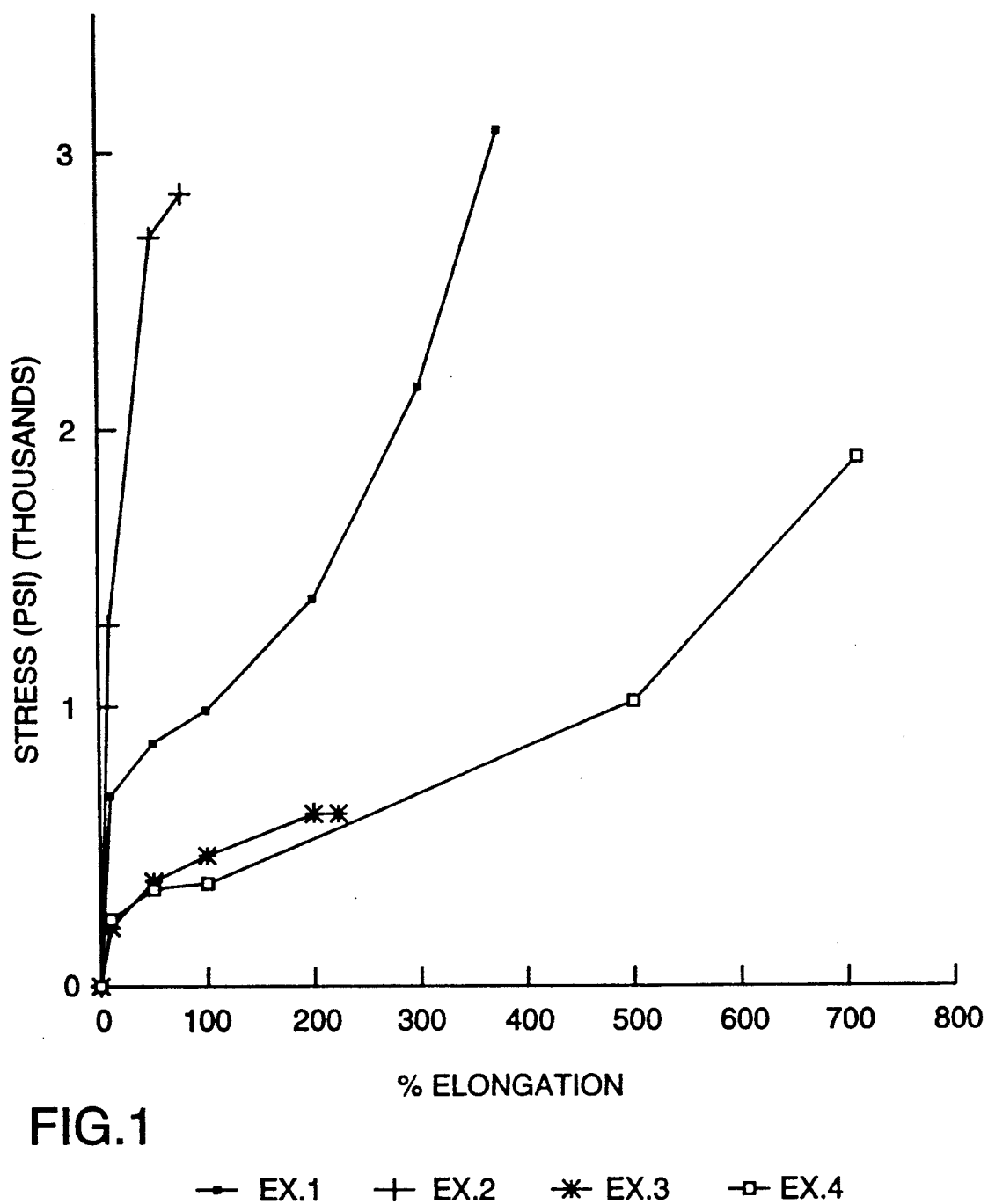
FIGS. 1 and 2 show the stress-strain curve for various unfilled resin compositions. EVA/EPDM, EVA block copolymer blends and ionomer blends are unique in their elongation, tensile strength and minimal yield-/necking tendencies when compared with other resin blends.

Compositions of the invention comprise a resin component containing at least one ethylene-vinyl acetate copolymer (EVA). Ethylene vinyl acetate copolymers useful in the films of the invention contain at least about 10% by weight vinyl acetate, preferably at least 15% by weight. The resin component may contain only ethylene vinyl acetate, or it may also contain a rubber selected from EP and EPDM rubbers; when such a rubber is present, the resin component may contain as little as 60 percent EVA copolymer.

Useful rubber polymers comprise from about 50% to about 90% of ethylene, from about 10% to about 50% propylene, and from 0 to about 3% diene.

Examples of suitable diene monomers include, but are not limited to, conjugated dienes such as isoprene, butadiene, 2,3-hexadiene, and the like, and nonconjugated dienes such as 1,4-pentadiene, 1,5-hexadiene, 2,5-dimethyl-1,5 hexadiene, 1,4-hexadiene and the like; cyclic dienes such as cyclopentadiene, cyclohexadiene, dicyclopentadiene, 3-methyl-tricyclo(5,2,1)-3,8-decadiene, and the like, and alkenyl norborenes such as 5-ethylidene-2-norborene, 2-methallyl-5-norborene, and the like. These polymers are easily prepared by well know solution or suspension polymerization techniques.

Insulative films of the invention also contain a flame retardant system. The flame retardant system is present in an amount of from about 20 to about 32 percent based on the resin component.

At least one brominated flame retardant is present. Useful brominated flame retardants include decabromodiphenyl ether and ethylene bis(tetrabromo)phthalimide. The brominated flame retardant is present in amounts of from about 5% to about 25%, preferably from about 3% to about 7%.

The system further comprises at least one additional flame retardant containing antimony, e.g., antimony oxide or antimony oxide hydrate; such flame retardant being present in the amount of from about 155% to about 10%, preferably from about 3% to about 7%.

The system also contains an additional flame retardant selected from the group consisting of Group I and group II metal oxides and oxide hydrates. Preferred additional flame retardants include, but are not limited to alumina oxide trihydrate, aluminum oxide pentahydrate, and dibromo diphenyl ether, and ethylene bis(tetrabromo)phthalimide. All metal oxide hydrates present must be granular, as precipitated forms do not result in films with good properties. This is believed to be related to such factors as the particle size and the coatings used on the precipitated particles. The aluminum oxide flame retardant is present in an amount of from about 1% to about 20%, with the proviso that the ratio of the oxide trihydrate to the brominated flame retardant should be less or equal to 3.

Preferred insulating films of the invention also comprise a coupling agent selected from the group consisting of silane coupling agents. Alkyl silanes, amino silanes and the like are useful in films of the invention. Preferred films contain from about 0.05% to about 5% coupling agent.

Films of the invention may also comprise conventional additives such as reinforcing fillers, pigments such as carbon black, and $TiO_2$, dyes, ultraviolet stabilizers, plasticizers, fungicides, extenders, waxes, antioxidants, and the like, in amounts known to those skilled in the art.

Other useful fillers include fumed silica, calcium and magnesium carbonates, calcium and barium sulfates, aluminum silicates, and the like, which may be included in small amounts, such that they do not interfere with the physical properties required.

Films of the invention are useful as insulative wire and pipe coatings, as insulative backings for multilayer films, and especially, as electrical tape backings. Such films would also be useful for various molded and extruded items such as shoe soles, shower curtains, kitchen ware and the like.

The films of the invention are made by physically mixing the rubber, the ethylene vinyl acetate copolymer, and the flame retardant, along with any additives in a mill, mixer or extruder. The mixing conditions are not critical, and such processes are well known to one skilled in the art.

Films of the invention have a stress-stain curve having a wholly positive slope. Surprisingly, by balancing the flame retardant types, and amounts, the films of the invention demonstrate this slope, whereas most films have at least some portion of the slope which is negative. Electrical tapes backed with films with the positive slope demonstrate a vastly improved handling characteristic over the prior art low-halogen films; i.e., they approximate the stretch and "drape" characteristics of vinyl chloride backed electrical tapes. This is extremely critical for proper insulation and sealing of repaired cables and connections, as well as for acceptance by persons skilled in electrical maintenance and repair.

Tapes comprising backings of the invention have an improved low temperature performance as compared to prior art poly(vinyl chloride) backings. PVC film becomes very stiff, exhibits a yield point and is brittle at the low temperature. The filled blend retains good elongation and mechanical properties even at temperatures of about $-20°$ C. Further, vinyl does not have a stress-strain curve with a wholly positive slope at such low temperatures, whereas films of the invention do have a stress-strain curve which retains a positive slope even at $-20°$ C.

Electrical tapes of the invention have at least one side of the film backing coated with an adhesive. The adhesive may be any conventional adhesive known in the art, including but not limited to, natural rubber, thermoplastic elastomers, such as block copolymers, thermoset adhesives, acrylic adhesives, silicone adhesives and the like. The adhesive may further comprise such conventional additives as tackifiers, plasticizers, pigments, fillers, initiators, crosslinking agents, and the like, as desired.

The following examples are meant to be illustrative and should not be construed as limiting the scope of the invention, which is defined only by the claims. One skilled in the art would be able to create variations which would be within the spirit of the invention. Comparative examples are indicated by the use of the letter "C" in front of the example number.

Test Methods

Flame Retardance

Flame retardance was tested by the ASTM D1000 test method. This test involves wrapping a film strip around a wire with a 50% overlap and repeating with another film strip in the opposite direction. The wrapped wire is exposed to an open flame for 30 seconds. The flame is removed and the burn time of the film is measured. Desirable flame retardance would be exhibited by a material that does not begin to burn, or self extinguishes in less than 5 seconds.

Tensile Test

Tensile strength was tested by the ASTM D1000 tests method.

| Glossary of Abbreviations | |
| --- | --- |
| AO | ANTIOXIDANT |
| ASTM | AMERICAN SOCIETY OF TESTING AND MATERIALS |
| ATH | ALUMINUM TRIHYDRATE |
| BLOCK | BLOCK COPOLYMER Rubber |
| Br1, Br2... | BROMINATED FLAME RETARDANT |
| BUTYL | BUTYL RUBBER |
| CA | COUPLING AGENT |
| CB | CARBON BLACK |
| Dx | DISSIPATION FACTOR |
| EAA | POLY (ETHYLENE ACRLYIC ACID) COPOLYMER |
| EMA | POLY (ETHYLENE METHACRYLIC ACID) COPOLYMER |
| EPDM | ETHYLENE PROPYLENE DIENE MONOMER |
| EPR | ETHYLENE PROPYLENE RUBBER |
| EVA | POLY (ETHYLENE VINYL ACETATE) COPOLYMER |
| E(VA/AA) | POLY (ETHYLENE VINYL ACETATE/ACRYLIC ACID) COPOLYMER |
| EVOH | POLY (ETHYLENE VINYL ALCOHOL) COPOLYMER |
| HDPE | HIGH DENSITY POLYETHYLENE |
| LLDPE | LINEAR LOW DENSITY POLYETHYLENE |
| Mb1, Mb2... | MOLYBDENUM-CONTAINING FLAME RETARDANT |
| Mg1, Mg2... | MAGNESIUM-CONTAINING FLAME RETARDANT |
| P-N1, P-N2... | PHOSPHOROUS-NITROGEN FLAME RETARDANT |
| PA | PROCESSING AID |
| PB | POLYBUTYLENE |
| PBD | POLYBUTADIENE |
| PE | POLYETHYLENE |
| PP | POLYPROPYLENE |
| PVC | POLY (VINLY CHLORIDE) |
| Sb1, Sb2... | ANTIMONY COMPOUND (FLAME RETARDANT) |
| VINYL | POLY (VINYL CHLORIDE) |

EXAMPLES

Comparative Examples 1-C7

Two-component blends were prepared from an olefinic component and a thermoplastic component, the former being the major component and the latter being the minor component (olefin/thermoplastic ≧1), and were mixed together in a Brabender TM rheometer using a small mixing head with high shear paddles at 105° C. for 5 minutes until a uniform dispersion of the polymers in the thermoplastic blend was achieved. Olefinic components and rubberic components are listed below. These blends are unfilled.

Figure 2:
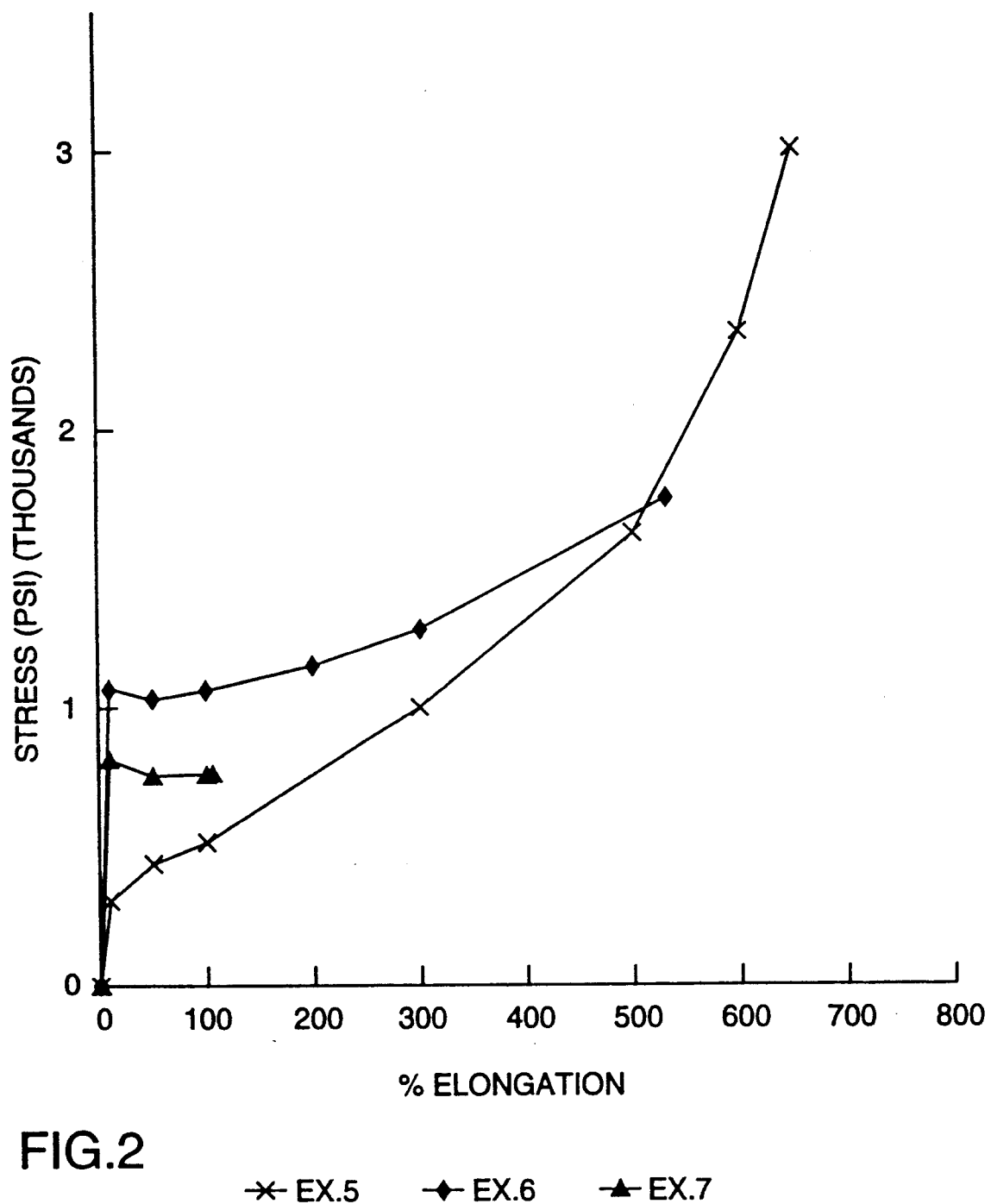

Blends were pressed between heated platens to form films about 125 μm to about 500 μm thick. Tensile properties of the films varied considerably in shape of the curve as well as tensile strength and elongation, as shown in FIGS. 1 and 2.

These figures show that EVA/EPDM, EVA block copolymer blends and ionomer blends having the required flame retardant system are unique in their elongation, tensile strength and minimal yield/necking tendencies. These blends have not undergone any type of post-processing, therefore the films are nonoriented, and noncrosslinked.

TABLE 1

| Example No. | Blend Components |
| --- | --- |
| 1 | IONOMER/EPDM2 80/20 |
| C2 | PP1/EPDM2 75/25 |
| C3 | PP2/EPDM3 60/40 |
| 4 | EVA/BLOCK COMPOLYMER 80/20 |
| 5 | EVA/EPDM2 80/20 |
| C6 | HDPE/BUTYL RUBBER |
| C7 | LLDPE/BUTYL RUBBER 75/25 |

Examples C8-C19

The mixing procedure described in Example 1 was used to prepare olefin/rubber blends which flame retardant fillers as listed below. Filled blends were pressed into films between heated platens, and flame retardance was measured as described in the test methods, above.

Measured burn time for these samples is listed in Table 2.

TABLE 2

| EX. NO. | BLEND COMPONENTS | FILLER CONCENTRATION | BURN TIME |
| --- | --- | --- | --- |
| C8 | EVA1/EPDM1 (50/50) | 0 | 56 s |
| C9 | EVA1/EPDM1/ATH1 (25/25/50) | 50% | 42 s |
| 10 | EVA1/EPDM1/Br1/Sb1 (35/35/22/8) | 30% | 1 s |
| C11 | EVA1/EPDM1/Mg1 (31/31/38) | 38% | 34 s |
| 12 | EVA1/EPDM1/Br2 (35/35/30) | 30% | 1 s |
| C13 | EVA1/EPDM1/ATH1/Br1/Sb1 (30/30/25/11/4) | 40% | 10 s |
| C14 | EVA1/EPDM1/ATH1/Br1/Sb1 (32/32/30/4.4/1.6) | 36% | 20 s |
| C15 | EVA2/EPDM2/CB/Br1/Sb1/Mb1 (62/21/1/8/4/4) | 16.5% | 45 s |
| 16 | EVA1/EPDM2/CB/ATH2/Br1/Sb1 (62/11/1/13/9/4) | 26% | 1 s |
| 17 | EVA1/EPDM3/CB/ATH2/Br1/Sb1 (51/17/1/16/10/5) | 32% | 1 s |
| 18 | EVA1/EPDM3/CB/ATH/Br1/Sb1 (55/18/1/8/12/6) | 25% | 2 s |
| C19 | EVA1/EPDM3/CB/Br1/Sb1/Mg2 (57/19/1/11/5/7) | 23% | 31 s |

The unfilled polymer blend, example C8, exhibits uncontrolled burning until the sample is consumed. Different flame retardant fillers have varied effects on the flame retardance of the filled blends.

As can be seen, it is not merely the concentration of flame retardant present; to achieve flame retardance while maintaining good mechanical film properties, i.e., elongation >500%, it is necessary to use a flame retardant system and filler level within the scope of the invention.

Comparative Examples C20-C22

The following blends listed in Table 3, were prepared by Banbury TM mixing followed by two roll milling and then calendering.

TABLE 3

| EXAMPLE | BLEND COMPONENTS | FILLER CONCENTRATION |
|---|---|---|
| C20 | EVA2/EPDM2 (75/25) | 0% |
| C21 | EVA2/EPDM2 (85/25) | 0% |
| C22 | EVA2/EPDM2/ATH1/Br1/Sb1/Mb1 (59/15/11/7/4/4) | 26% |

Figure 3:
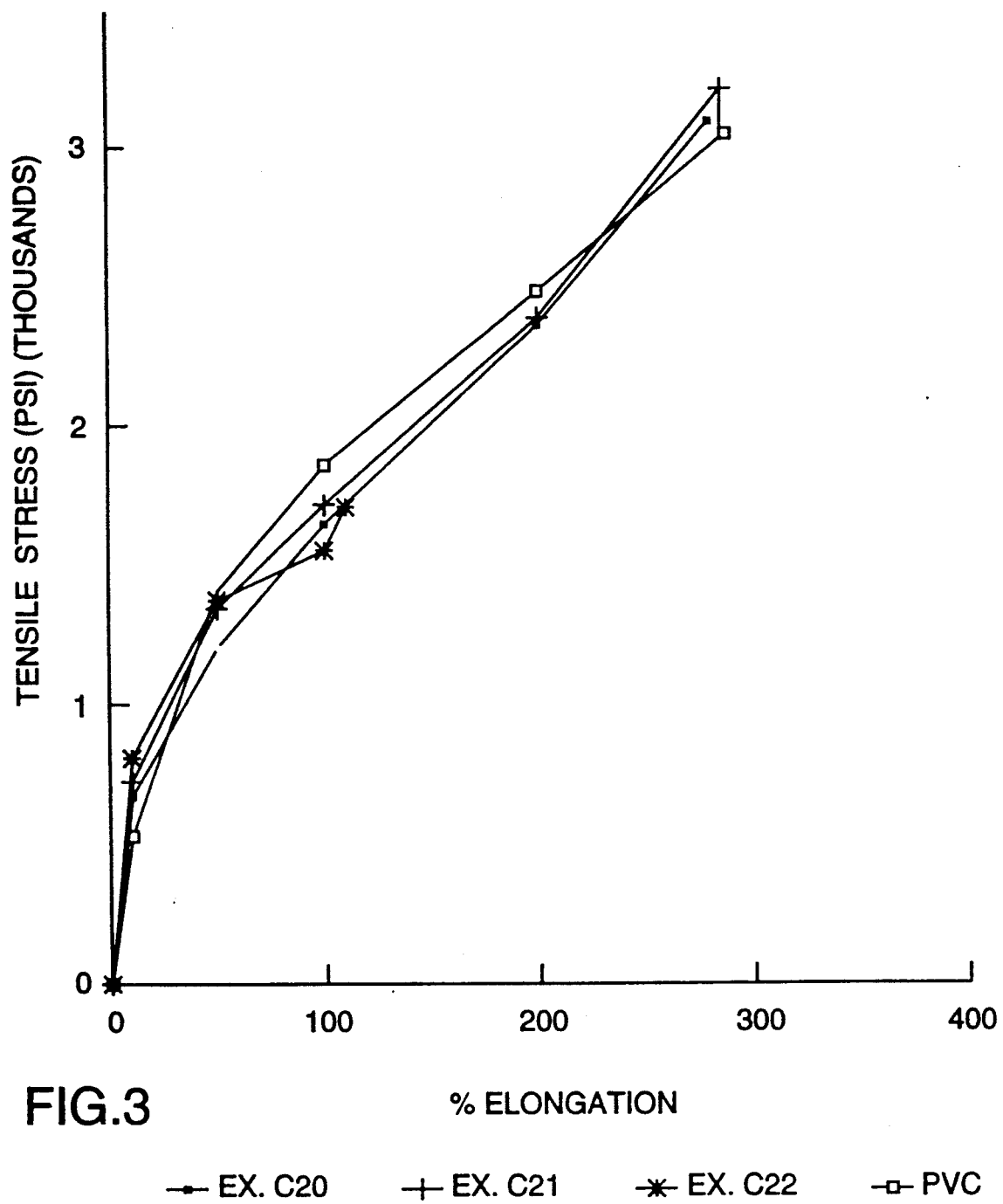
FIG. 3 shows that a filled blend outside the scope of the invention exhibits very poor elongation.

Film forming conditions and post-processing conditions were chosen to modify the stress-strain curve to yield properties similar to that of plasticized poly (vinyl chloride) (PVC) film. The tensile curves for C20, C21, C22 and plasticized PVC are displayed in FIG. 3. The curves for blends without fillers are very similar to the vinyl curve while this filled blend, outside the scope of the invention, exhibits very poor elongation.

Examples 23–28

Figure 4:
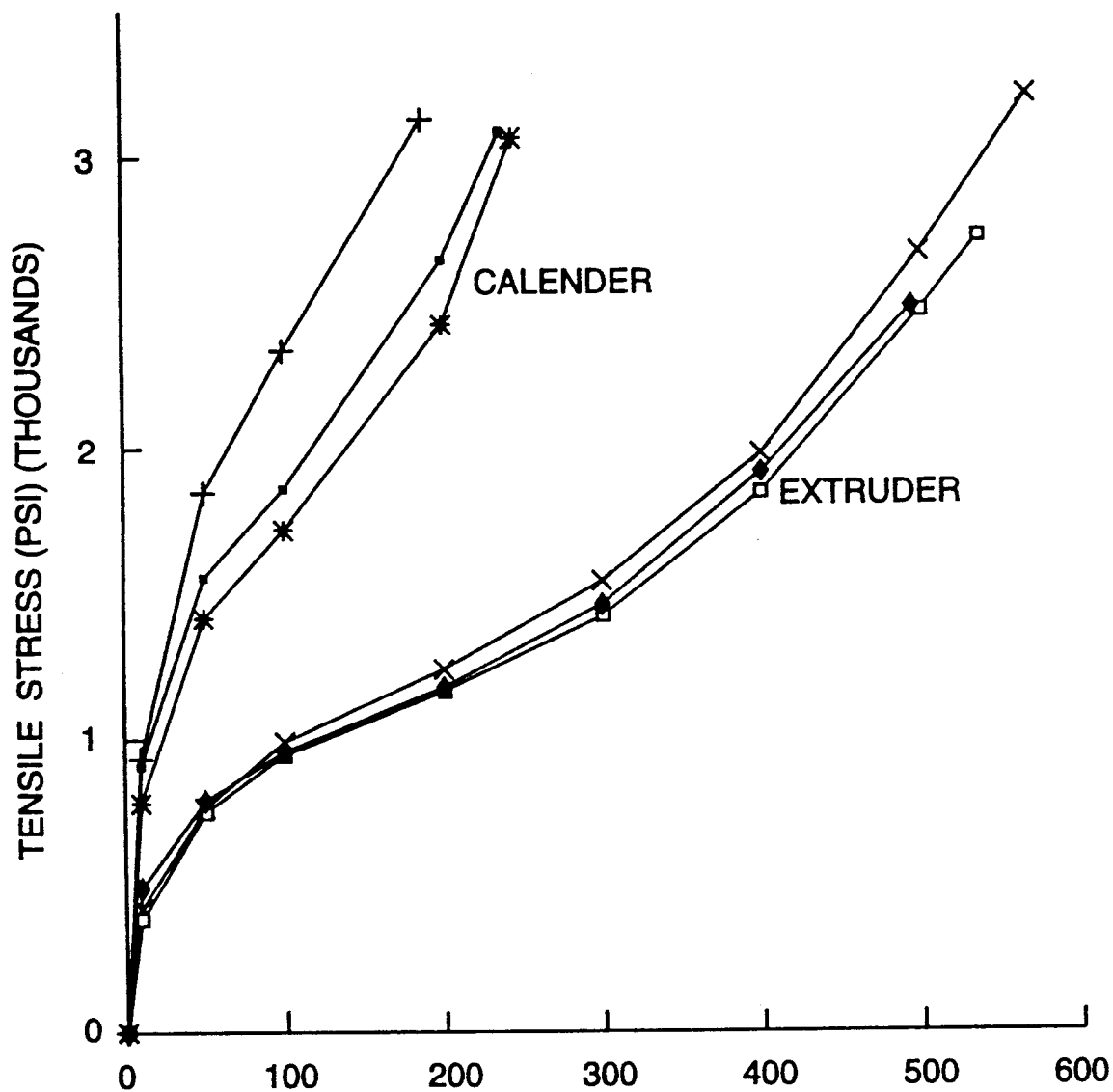
FIG. 4 shows that films containing a coupling agent exhibit improved tensile-elongation properties.

Filled blends listed in Table 4 were prepared by the following two methods: Banbury mixing followed by two roll milling then calendaring; and, twin screw extrusion through a film die. Tensile results were performed on each film and are shown in FIG. 4. Examples containing coupling agent exhibit improved tensile-elongation properties.

Figure 5:
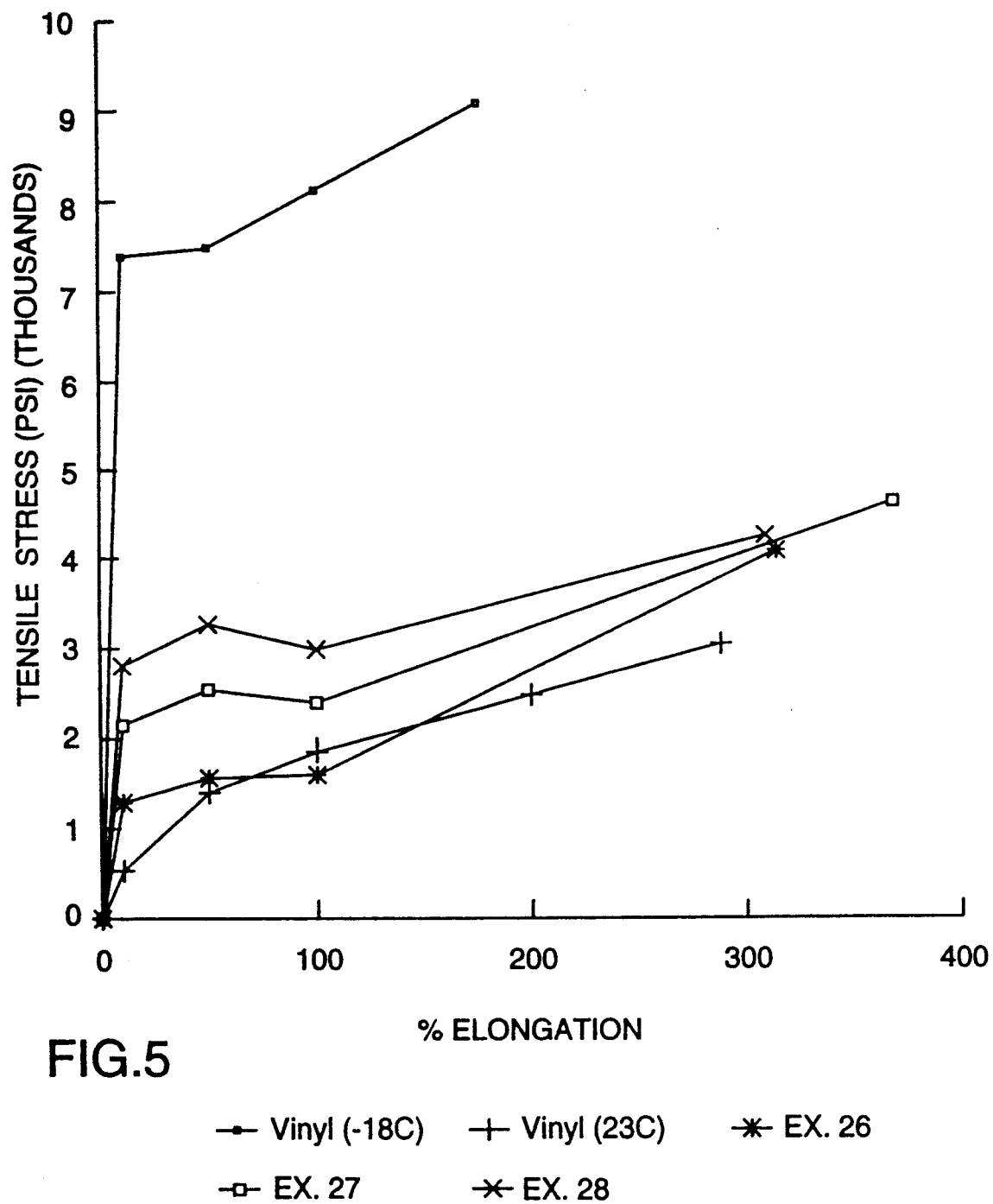
FIG. 5 shows that a film of the invention retains elongation and mechanical properties closely resembling the ambient properties of plasticized PVC even at −18° C. whereas the PVC film becomes very stiff, exhibits a yield point and is brittle at the low temperature.

Tensile tests of these extruded films were then performed at −18° C. Tensile tests at room temperature and at −18° C. were also performed on plasticized PVC film. FIG. 5 compares results for these samples. The PVC film becomes very stiff, exhibits a yield point and is brittle at the low temperature. The filled blend retains elongation and mechanical properties more closely resembling the ambient properties of plasticized PVC.

TABLE 4

| EXAM | BLEND COMPOSITION (parts by weight) (EVA2/EPDM2/ATH2/Br1/Sb1/PA/AO) | OTHER ADDITIVE | PROCESSING METHOD |
|---|---|---|---|
| 23 | (80/20/20/11/5/1/.15) | none | calender |
| 24 | (80/20/20/11/5/1/.15) | coupling agent | calender |
| 25 | (80/20/15/11/5/1/.15) | Mb1 | calender |
| 26 | (80/20/20/11/5/1/.15) | none | extruder |
| 27 | (80/20/20/11/5/1/.15) | coupling agent | extruder |
| 28 | (80/20/15/11/5/1/.15) | Mb1 | extruder |

Examples 29–32

Filled blends were prepared by twin screw extrusion through a film die. Flame retardance for the films was tested by the ASTM D1000 test with the following results shown in Table 5. As can be seen, the coupling agent causes flame retardance to improve for the filled blends.

TABLE 5

| EXAM. # | BLEND COMPOSITION (parts by weight) | FILLER CONCENTRATION | COUPLING AGENT | BURN TIME |
|---|---|---|---|---|
| 29 | EVA2/EPDM2/ATH2/Br1/Sb2/PA/CA/CB/AO (80/20/20/11/5/1/0/0/.15) | 27% | N | 11 s |
| 30 | EVA2/EPDM2/ATH2/Br1/Sb2/PA/CA/CB/AO (80/20/20/11/5/1/.3/0/.15) | 27% | Y | 2 s |
| 31 | EVA2/EPDM2/ATH2/Br1/Sb2/PA/CA/CB/AO (80/20/20/11/5/1/.3/0/.15) | 27% | Y | 1 s |
| 32 | PB/EPDM3/EPR/EVA3/CB/LLDPE/ATH2/Br2/Sb2/AO (22/36/10/14/2/16/20/11/5/.15) | 28% | N | 16 s |

Example 33

Figure 6:
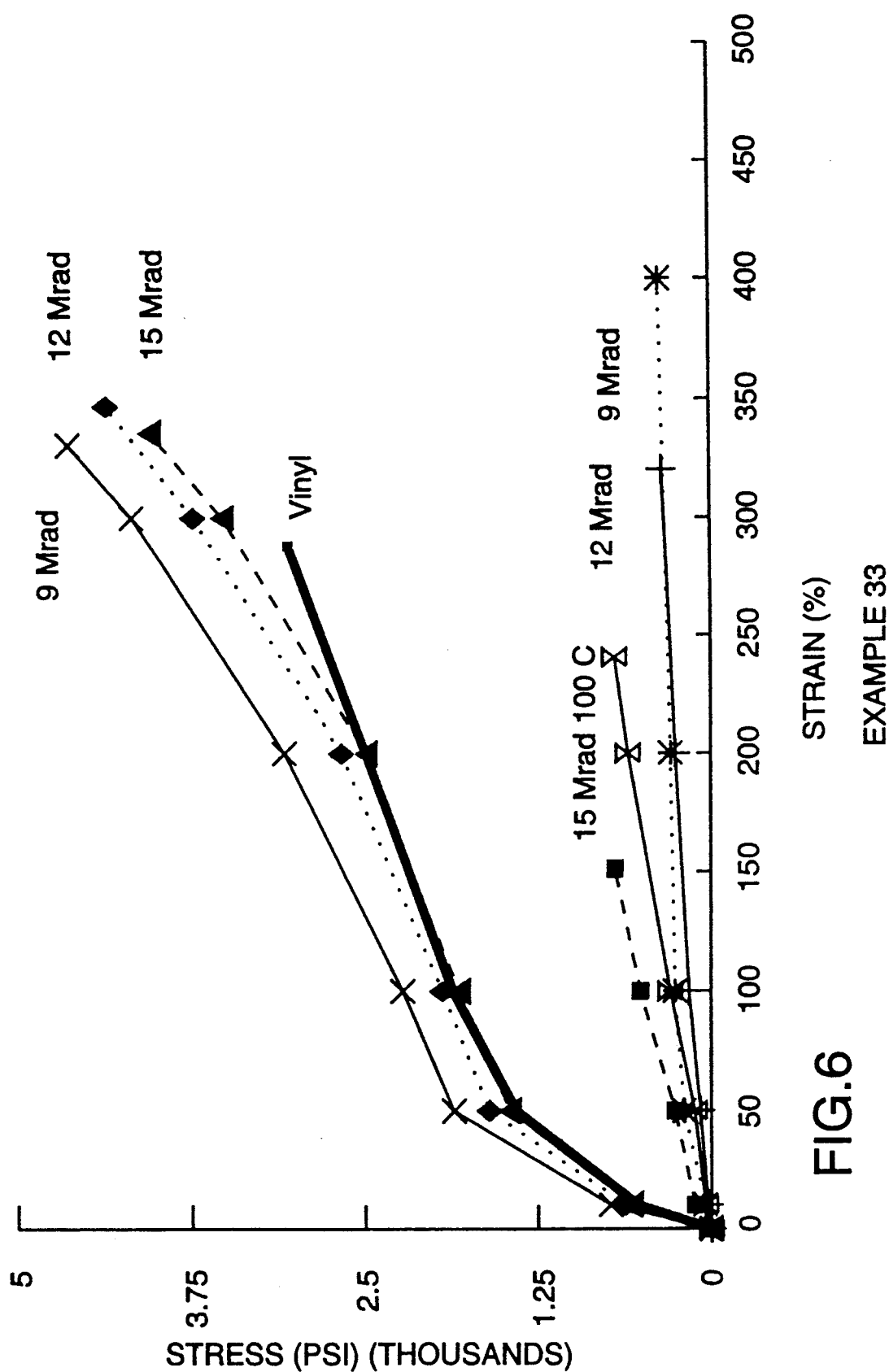
FIGS. 6 and 7 compare tensile performance of a film of the invention and a poly(vinylchloride) film at ambient temperature and at 100° C., as a function of amount of irradiation. The filled blend retains elongation and mechanical properties more closely resembling the ambient properties of plasticized PVC. Tensile values for all films drop considerably as the temperature is raised. The tensile values for blends of this invention do not drop as greatly as tensile values for plasticized vinyl film.

Tensile performance at ambient temperature and at 100° C. of the blend listed below is displayed in FIGS. 6 and 7 as a function of amount of irradiation. Tensile properties of plasticized vinyl film at room temperature and at 100° C. are also shown for comparison.

| EVA2 | EPDM2 | ATH2 | Br1 | Sb2 | CA | AO |
|---|---|---|---|---|---|---|
| 80 | 20 | 20 | 11 | 6 | 0.3 | 0.15 |

Tensile values for all films drop considerably as the temperature is raised. The tensile values for blends of this invention do not drop as greatly as tensile values for plasticized vinyl film. High temperature elongation of the present invention at 9 and 12 Mrads is comparable to the ambient temperature elongation of vinyl, while elongation of vinyl film at 100° C. is quite high.

Figure 7:
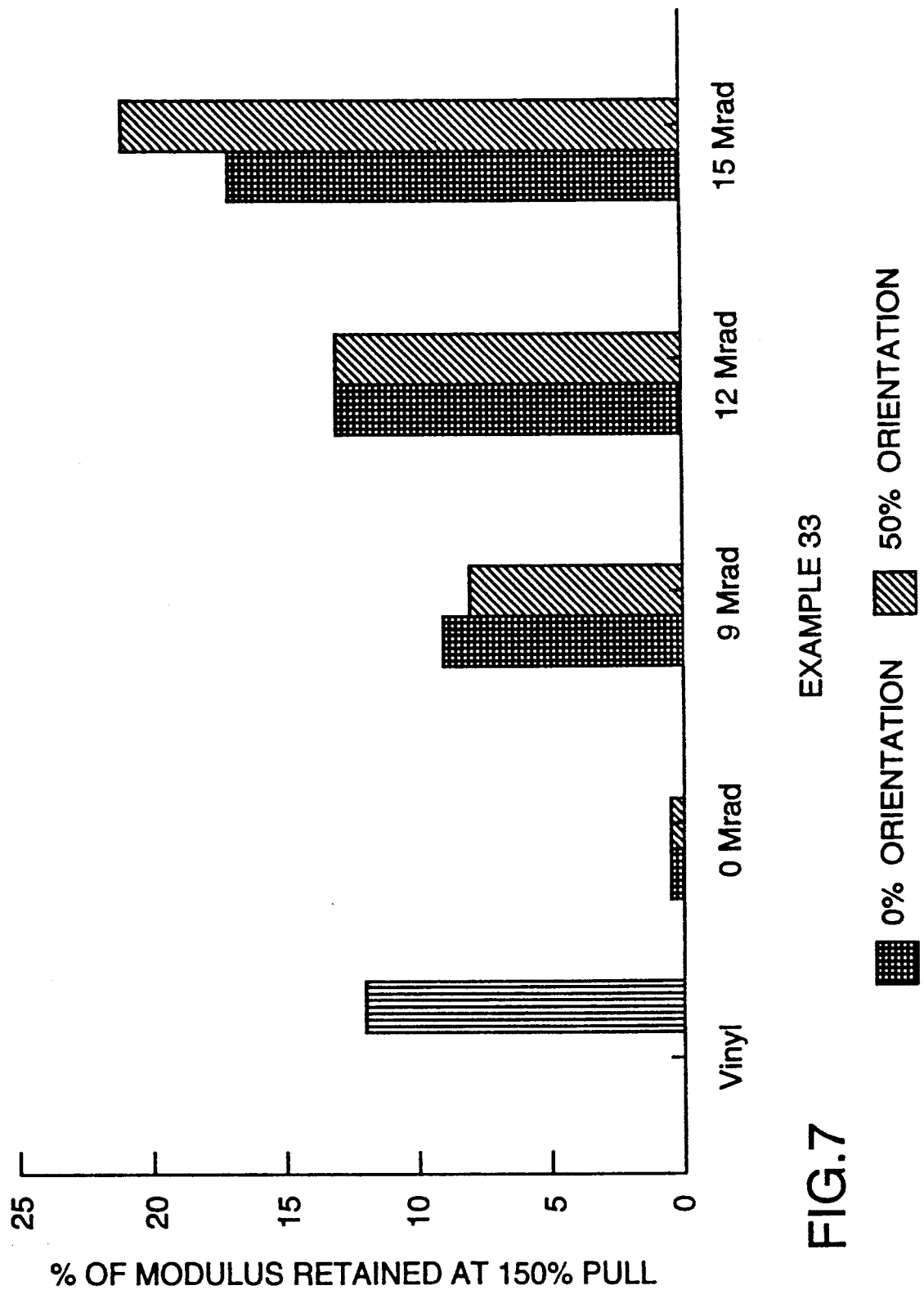

FIG. 7 shows the ratio of the tensiles at 100° C. to the tensiles at room temperature, indicating the amount of tensile strength retained at high temperature. The sample irradiated at 15 Mrads is clearly superior to the other samples.

Examples 34–35

Blends listed below were extruded into films and post-processed. Strips of these films and strips of plasticized vinyl film, having approximately the same thickness, were cut and exposed to various solvents of the most commonly encountered types (ethyl acetate, toluene, acetone). The change in weight, length and width were used as measures of swelling of the film. A large change in length indicates high swelling and good compatibility of the solvent and the film, which is undesirable. No change in length indicates good solvent resistance of the film and better performance under harsh conditions. Solvent resistance results are listed in Table 6.

TABLE 6

| Component | Example 34 | Example 35 |
|---|---|---|
| EVA2 | 80 | — |
| EPDM1 | 20 | — |
| E(VA/AA)1 | — | 100 |
| ATH2 | 20 | 20 |
| Br1 | 11 | 11 |
| Sb1 | 5 | 5 |
| CA | 0.3 | 0.3 |
| AO | 0.15 | 0.15 |
| PA | 1 | 1 |

TABLE 7

| % CHANGE | Vinyl | Example 33 | Example 34 |
|---|---|---|---|
| TOLUENE: | | | |
| WEIGHT | −28.5 | −12 | −13.5 |
| LENGTH | −16 | −1 | −31 |
| WIDTH | −12 | −8 | −1 |
| ETHYL ACETATE: | | | |
| WEIGHT | −14 | 0 | −4 |
| LENGTH | −18 | −1 | −3 |
| WIDTH | −6 | 0 | −2 |
| ACETONE: | | | |
| WEIGHT | −33 | 0 | −2 |
| LENGTH | −25 | 0 | −2 |
| WIDTH | −9 | 0 | 0 |

Examples C35 and C36

Figure 8:
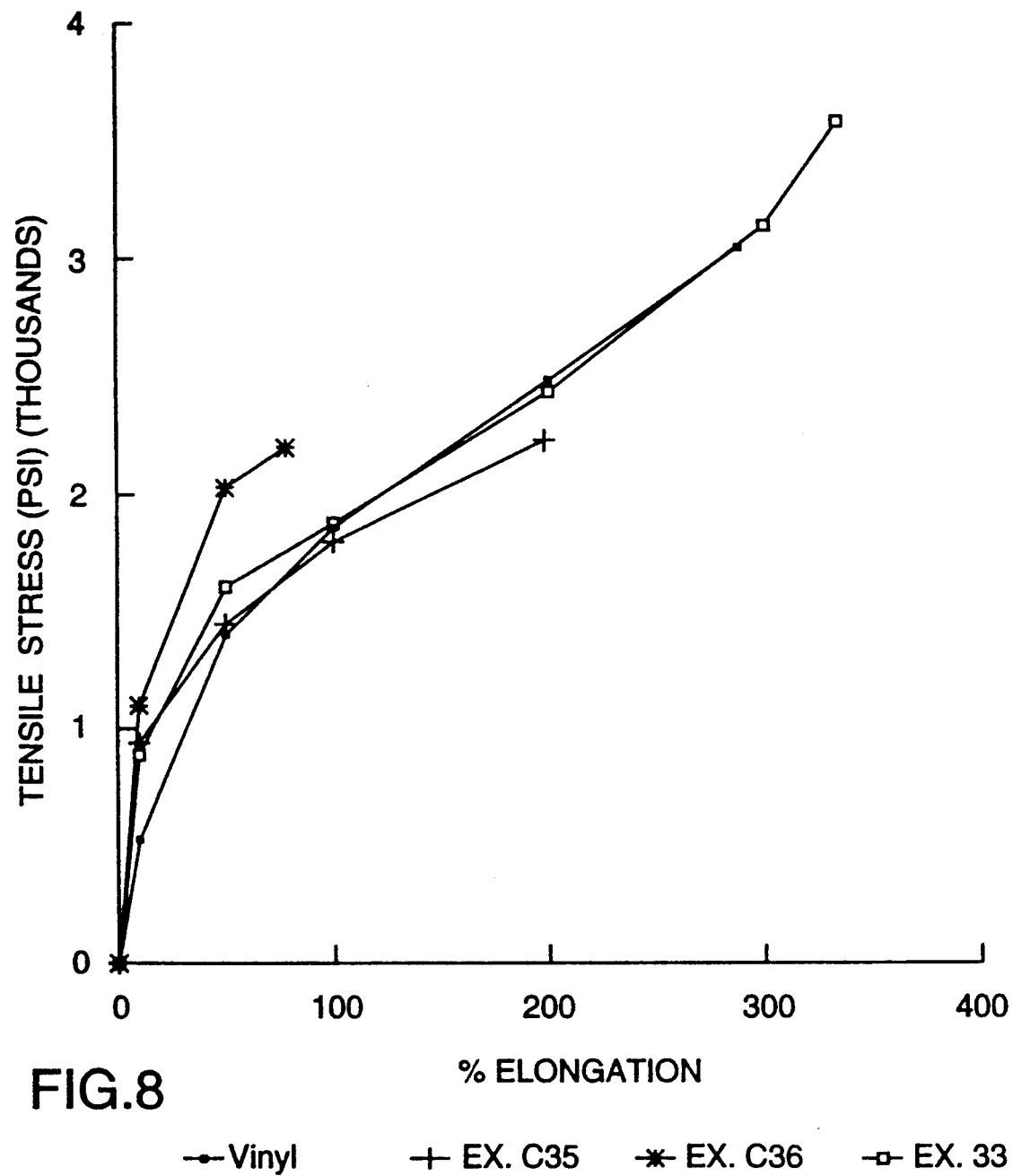
FIG. 8 shows ambient stress-strain curves of two comparative products and a filled film of this invention, Example 30, (with post-processing), compared with plasticized PVC. The film of the invention shows good tensile properties and the wholly positive slope required for good mechanical performance. The comparative products do not show such slope and good tensile properties.

Two commercial non-vinyl electrical tapes are known: Polyken TM and Polynor TM. Ambient stress-strain curves and flame retardance times of these two products, a filled blend of this invention, Example 30, with post-processing, and plasticized PVC are shown in FIG. 8 and Table 7, respectively.

TABLE 7

| TAPE | BURN TIME |
|---|---|
| 3M VINYL | 1 s |
| Ex. C35 (POLYKEN (EVA BASED)) | until consumed |
| Ex. C36 (POLYNOR (PE BASED)) | until consumed |
| Ex. 30 | 1 s |

The deficiencies of these low halogen products outside the scope of the invention are lack of flame retardance and poor tensile strength, low elongation and necking characteristics. Performance of the filled system of this invention shows good tensile and flame retarding performance.

Examples C37–39

The abrasion resistance of the following films was evaluated using a Taber Abraser model 503 and a consistent test methodology. The average weight loss from abrasion is listed in Table 8. A higher weight loss indicates poorer abrasion resistance.

TABLE 8

| EXAM. # | BLEND COMPOSITION (parts by weight) | FILLER CONCENTRATION | WEIGHT LOSS (g) |
|---|---|---|---|
| C37 | PLASTICIZED VINYL | 9% | .135 |
| 38 | EVA2/EPDM2/ATH2/Br1/Sb2/PA/CA/AO (80/20/20/11/5/1/.3/.15) | 27% | .092 |
| 39 | E(VA/AA)/ATH2/Br1/Sb1/PA/CA/AO (100/20/11/5/1/0/.15) | 27% | .051 |

The weight loss for each filled blend is lower than that for plasticized PVC.

Example 40

The composition described in Example 30 was melt processed in a twin screw extruder through a film die. Post-processing conditions of orientation and crosslinking of this film varied. Strips of this composition with different post-processing conditions were cut and the initial length was measured. Strips were placed in the oven at 140° F. for one week. The average percent change in length (shrinkage) is recorded in Table 9.

TABLE 9

| EXAMPLE | POST-PROCESSING | % SHRINKAGE |
|---|---|---|
| EX 40 | unoriented, uncrosslinked | 8 |
| EX 40 | oriented, uncrosslinked | 20–27 |
| EX 40 | unoriented, crosslinked | 1.2 |
| EX 40 | oriented, crosslinked | 1.2–2.5 |
| PVC | unoriented, uncrosslinked | 1.9 |

Crosslinking of the filled blends of this invention provides a film with thermal dimensional stability, comparable to plasticized PVC film.

Example 41

Figure 9:
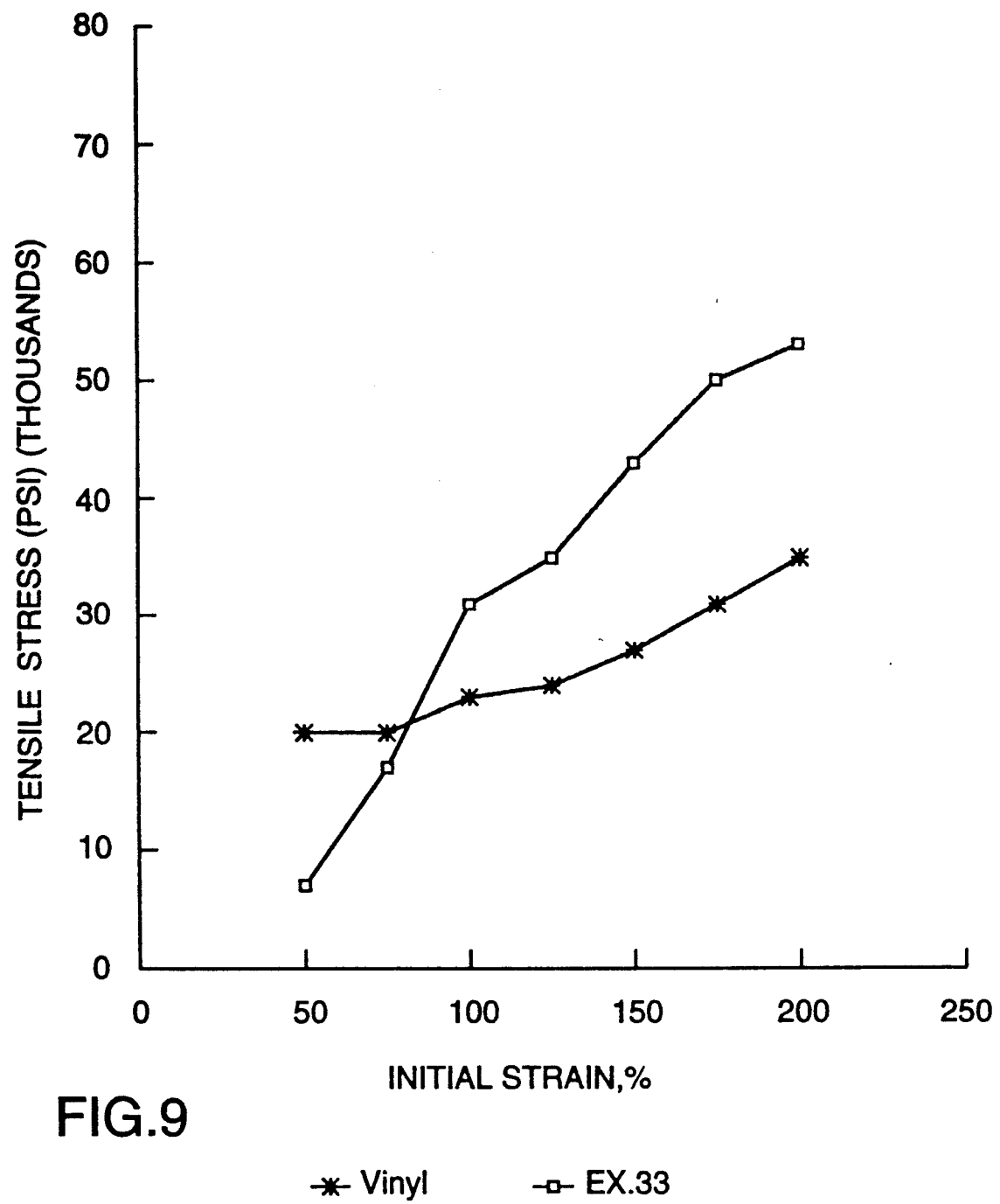
FIG. 9 shows the amount of unrecovered strain/initial strain of a PVC film plotted versus initial strain for Example 30. The unrecovered strain is less for the filled blend film up to about 75% initial strain. Strain recovery is an important feature for applying electrical tapes to maintain a tight wrap and aid in conformability. Typical application strains range from about 50 to 100%. In this range, the present invention is comparable to, or superior to plasticized PVC film.
Figure 10:
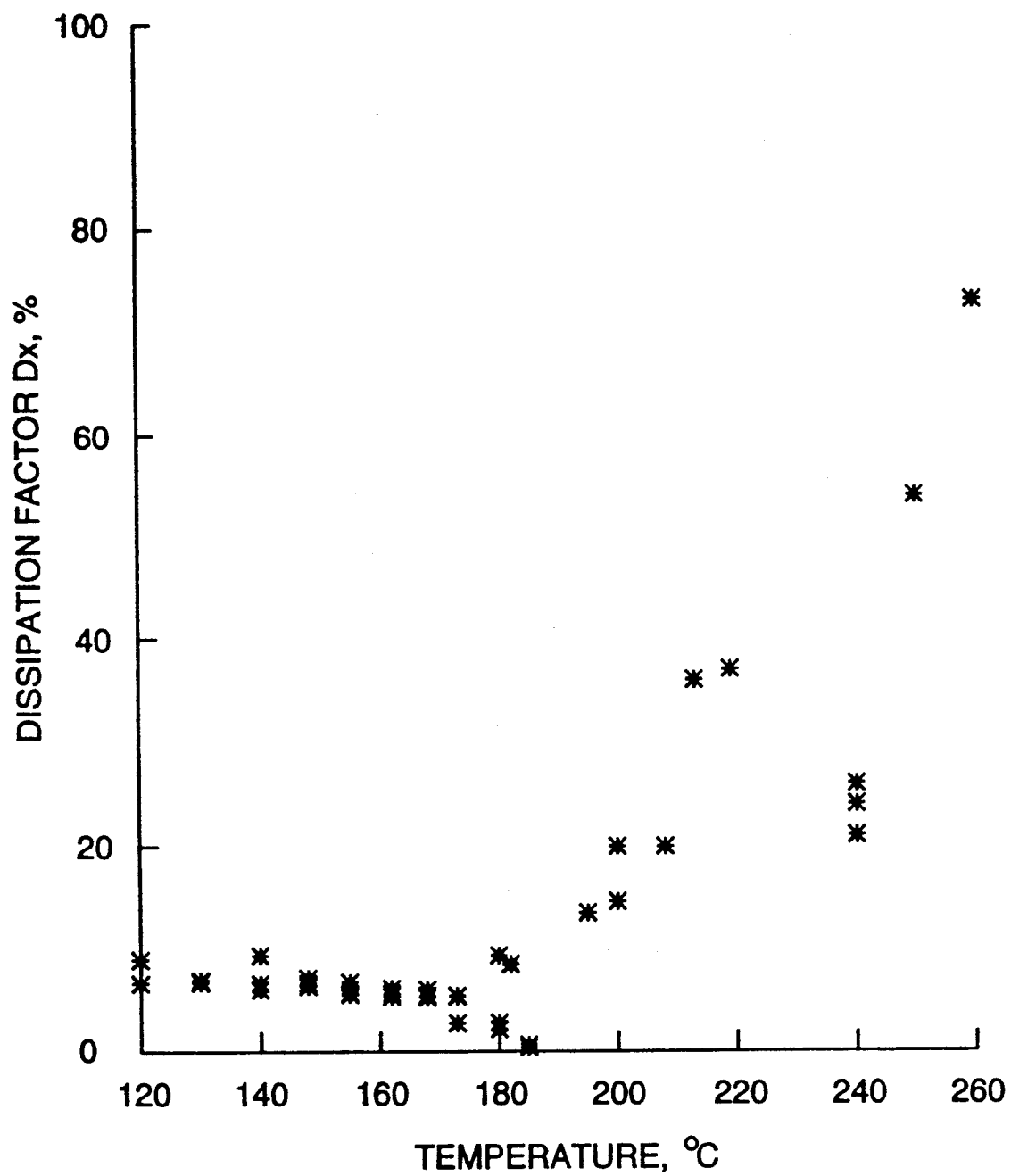
FIG. 10 shows the onset dissipation factor for a film of the invention. The dissipation factor marks the temperature limit for proper insulative performance. An onset of 150° C. is typical in transformer applications. The onset of this material occurs at about 180° C. to about 190° C., demonstrating the improved high temperature performance.

Hysteresis tests were performed on plasticized vinyl film and on a filled blend film of the present invention. The amount of unrecovered strain/initial strain is plotted versus initial strain for these two materials in FIG. 9. While the amount of unrecovered strain increases more rapidly for the filled film of this invention than for the PVC film, the unrecovered strain is less for the filled blend film up to about 75% initial strain. Strain recovery is an important feature for applying electrical tapes to maintain a tight wrap and aid in conformability. Typical application strains range from about 50 to 100%. In this range, the present invention is comparable to, or superior to plasticized PVC film.

Examples 42–44

The electrical insulation characteristics of a material are extremely important in electrical wire and cable coatings, coverings and tapes. Typically, neat polymers are good electrical insulators, but this property can be degraded by the addition of filler materials such as flame retardants. The dielectric breakdown strength, a measure of the electrical insulation properties, was evaluated for the films described in Table 10 and for premium vinyl electrical tape. Dielectric breakdown strength results are also listed in Table 10.

TABLE 10

| EXAM. # | BLEND COMPOSITION (parts by weight) | FILLER CONCENTRATION | DIELECTRIC STRENGTH, V/mil | |
|---|---|---|---|---|
| | | | WET | DRY |
| 42 | EVA2/EPDM2/ATH2/Br1/Sb2/CA/AO (80/20/20/20/6/.3/.15) | 32% | 1940 | 1900 |
| 43 | EVA2/EPDM2/Mg2/Br1/Sb2/CA/AO (80/20/20/11/5/.3/.15) | 27% | 1780 | 1780 |

TABLE 10-continued

| EXAM. # | BLEND COMPOSITION (parts by weight) | FILLER CONCENTRATION | DIELECTRIC STRENGTH, V/mil WET | DRY |
|---|---|---|---|---|
| 44 | PLASTICIZED VINYL | 9% | 1600 | 1600 |

Dielectric breakdown strength of the blends of the present invention meets or exceeds the dielectric strength of premium vinyl electrical tape.

Example 45

A layer having the composition described below, was extruded and post-processed. Pieces of the layer were cut and hot pressed (200° F.) against aluminum panels until the layer and aluminum adhered to each other. The aluminum panels have a ridge running lengthwise to emulate a typical wire radius. Some panels were prepared with the layer only on one side while other panels were prepared with the layer covering both sides and sealed on the edges. Those with one side covered were used for dielectric breakdown strength testing on the flat regions and on the ridges of the panel, while those with both sides covered were examined by a dissipation factor test as a function of temperature. These two tests provide fundamental electrical property information to screen potential materials for electrical wire insulation, especially in transformer applications.

| COMPOSITION | | | | | | | |
|---|---|---|---|---|---|---|---|
| EVA1 | EPDM1 | ATH2 | Br1 | Sb2 | CA | CB | AO |
| 80 | 20 | 20 | 11 | 6 | 0.3 | 1 | 0.15 |

Averaged test results for dielectric strength are 1650 V/mil for the flat regions and 1640 V/mil for the ridges. Dielectric strength values greater than 1000 V/mil provide sufficient insulation for wire coverings.

The Dissipation factor, $D_x$, for this example was figured and plotted in FIG. 11. The onset of increase in the dissipation factor marks the temperature limit for proper insulative performance. An onset of 150° C. is typical in transformer applications. The onset of this material occurs at about 180° C. to about 190° C., demonstrating the improved high temperature performance.

What is claimed is:

1. A low-halogen, electrically insulating film having a total halogen content of about 1% to about 8%, comprising a resin component containing:
   a) from 0 to about 40 parts of a rubber selected from EP or EPDM rubber,
   b) correspondingly, from about 60 to about 100 parts of an ethylene vinyl acetate polymer,
   c) from about 20% to about 40% based on said resin component of a flame retardant system comprising
      i) from about 5 to about 25% of a bromine containing flame retardant, and
      ii) from about 1.5% to about 10% of an antimony containing flame retardant, and
      iii) from 1% to 20% of a flame retardant selected from granular metal oxide hydrates, wherein said flame retardant system has a ratio of metal oxide hydrate to bromine-containing flame retardant of no more than about 3;
said film being free of vinyl chloride, wherein a nonoriented film self-extinguishes in less than about 5 seconds, has an elongation at break of at least about 500%, a dielectric strength of at least about 1200 V/Mil, and a stress-strain curve with a wholly positive slope.

2. A low-halogen, electrically insulating film according to claim 1 containing from about from about 10 to about 15% of said bromine containing flame retardant.

3. A low-halogen, electrically insulating film according to claim 1 containing from about 3% to about 7% of said antimony containing flame retardant.

4. A low-halogen, electrically insulating film according to claim 1 further comprising from about 0.05% to about 5% of a silane coupling agent.

5. A low-halogen, electrically insulating film according to claim 4, wherein said coupling agent is selected from the group consisting of alkyl silanes, and amino silanes.

6. A low-halogen electrical tape backing having a total halogen content of about 1% to about 8% comprising:
   a) from 10 to about 40 parts of a rubber selected from EP or EPDM rubber,
   b) correspondingly, from about 60 to about 90 parts of an ethylene vinyl acetate polymer,
   c) from about 20% to about 40% based on said resin component of a flame retardant system comprising
      i) from about 5 to about 25% of a bromine containing flame retardant, and
      ii) from about 1.5% to about 10% antimony oxide, and
      iii) from 1% to about 20% of aluminum trihydrate, wherein said flame retardant system has a ratio of aluminum trihydrate to bromine-containing flame retardant of no more than about 3;
said film being free of vinyl chloride, wherein a nonoriented film self-extinguishes in less than about 5 seconds, has an elongation at break of at least about 500%, a dielectric strength of at least about 1200 V/Mil, and a stress-strain curve with a wholly positive slope.

7. A low-halogen electrical tape backing according to claim 6 containing from about from about 10% to about 15% of said bromine containing flame retardant.

8. A low-halogen electrical tape backing according to claim 7 containing from about 3% to about 7% of said antimony containing flame retardant.

9. A low-halogen electrical tape backing according to claim 6 further comprising from about 0.05% to about 5% of a silane coupling agent.

10. A low-halogen electrical tape backing according to claim 9, wherein said coupling agent is selected from the group consisting of alkyl silanes, and amino silanes.

11. An electrical tape comprising a backing film having a total halogen content of about 1% to about 8%, comprising a resin component containing:
   a) from 0 to about 40 parts of a rubber selected from EP or EPDM rubber,
   b) correspondingly, from about 60 to about 100 parts of an ethylene vinyl acetate polymer,
   c) from about 20% to about 40% based on said resin component of a flame retardant system comprising
      i) from about 5 to about 25% of a bromine containing flame retardant, and ii) from about 1.5% to about 10% of an antimony containing flame retardant, and iii) from 1% to about 20% of granular aluminum trihydrate, wherein said flame retardant system has a ratio of aluminum trihydrate to bromine-containing flame retardant of no more than about 3;

said film being free of vinyl chloride, wherein said tape self-extinguishes in less than about 5 seconds, has an elongation at break of at least about 500%, a dielectric strength of at least about 1200 V/Mil, and a stress-strain curve with a wholly positive slope, and an adhesive coated on one major surface of said backing.

12. An electrical tape according to claim 11 wherein said backing film contains from about from about 10% to about 15% of said bromine containing flame retardant.

13. An electrical tape according to claim 12 wherein said backing film contains from about 3% to about 7% of said antimony containing flame retardant.

14. An electrical tape according to claim 11 wherein said backing film further comprises from about 0.05% to about 5% of a silane coupling agent.

15. A low-halogen electrical tape backing according to claim 14, wherein said coupling agent is selected from the group consisting of alkyl silanes, and amino silanes.

* * * * *

UNITED STATES PATENT AND TRADEMARK OFFICE
CERTIFICATE OF CORRECTION

PATENT NO. : 5,284,889

DATED : February 8, 1994

INVENTOR(S) : Eumi Pyun and Pamela S. Tucker

It is certified that error appears in the above-indentified patent and that said Letters Patent is hereby corrected as shown below:

On the title page, in the abstract, "free of vinyl chloride wherein" should read --free of vinyl chloride, wherein--.

Column 2, Line 9, "amount f a" should read --amount of a--.

Column 2, Line 61, "8%" should read --8%.--

Column 3, Line 57, after "from about" insert --60--.

Column 5, Line 27, "know" should read --known--.

Column 5, Line 41, "155%" should read --1.5%--.

Column 7, Line 8, "tests" should read --test--.

UNITED STATES PATENT AND TRADEMARK OFFICE
CERTIFICATE OF CORRECTION

PATENT NO. : 5,284,889
DATED : February 8, 1994
INVENTOR(S) : Eumi Pyun and Pamela S. Tucker It is certified that error appears in the above-indentified patent and that said Letters Patent is hereby corrected as shown below:

Column 8, Line 21, "which" should read --with--.

Column 14, Line 12, eliminate the first occurrence of "from about".

Column 14, Line 47, eliminate the first occurrence of "from about".

Column 16, Line 2, eliminate the first occurrence of "from about".

Signed and Sealed this

Twenty-seventh Day of September, 1994

Attest:

BRUCE LEHMAN

Attesting Officer    Commissioner of Patents and Trademarks